United States Patent

Prewett, Jr. et al.

[15] 3,672,246

[45] June 27, 1972

[54] AUTOMATIC SPINDLE GROWTH COMPENSATION SYSTEM

[72] Inventors: Hubert P. Prewett, Jr.; Charles H. Thompson, both of Oak Ridge, Tenn.

[73] Assignee: The United States of America as represented by the United States Atomic Energy Commission

[22] Filed: April 20, 1970

[21] Appl. No.: 29,925

[52] U.S. Cl. ..............................82/2 B, 90/13 C, 318/632, 318/634
[51] Int. Cl. ..................................G05d 23/275, B23b 23/06
[58] Field of Search................82/2 B, DIG. 1; 90/13 R, 13 C, 90/11 R; 318/632, 634; 408/13

[56] References Cited

UNITED STATES PATENTS 3,393,588  7/1968  Broome ..............................318/632 X
3,347,116  10/1967  Anderson et al....................318/632 X Primary Examiner—Gil Weidenfeld
Attorney—Roland A. Anderson

[57] ABSTRACT

A numerically controlled lathe is provided with a spindle growth compensator which continuously monitors the spindle growth using a displacement sensing device with a linear electrical output signal. The signal is them modified and used in the numerically controlled machine tool control unit to offset the programmed carriage position, thereby continuously compensating for spindle growth.

5 Claims, 6 Drawing Figures

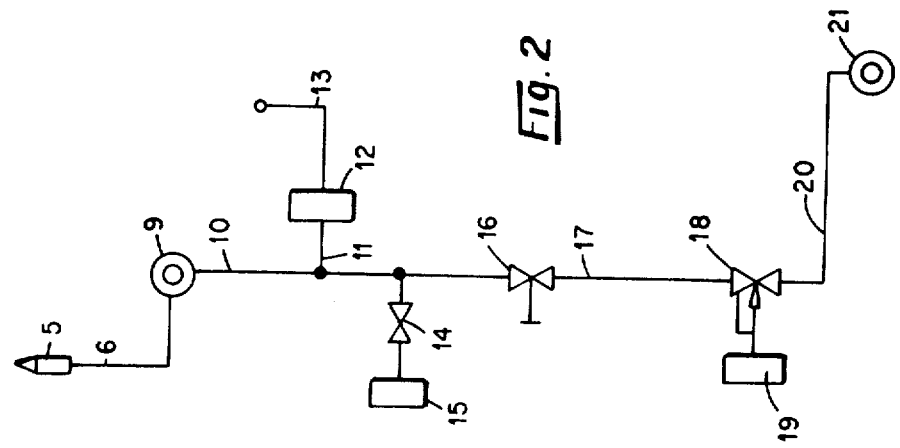
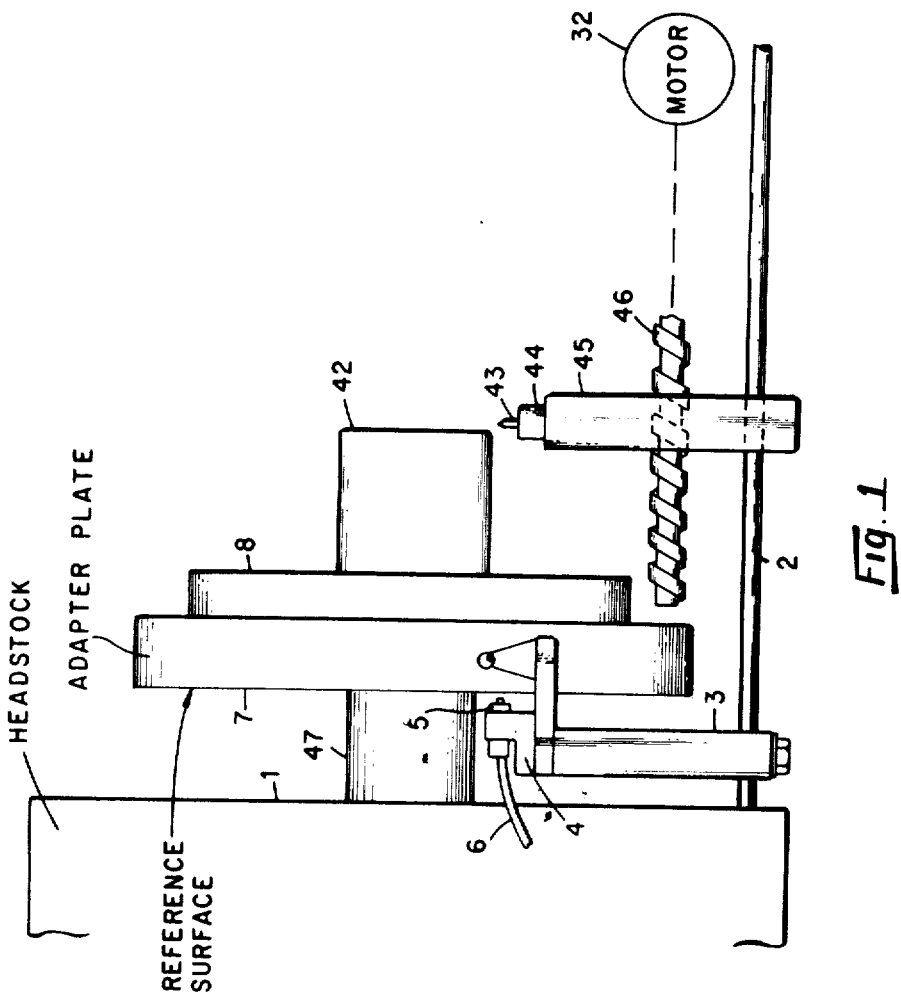

INVENTORS.
Hubert P. Prewett, Jr.
Charles H. Thompson
BY
ATTORNEY

AUTOMATIC SPINDLE GROWTH COMPENSATION SYSTEM

BACKGROUND OF THE INVENTION

This invention was made in the course of, or under, a contract with the U.S. Atomic Energy Commission.

For many years, spindle growth on numerically controlled lathes has been recognized as a machine error which limits the accuracy and repeatability of the machine tool. In fact, spindle growth has a direct influence on workpiece length. The spindle growth is caused by considerable heat which is generated in conventional lathe ball-bearing spindles and their drives. This heat causes the components of the spindle to expand, thereby changing the location of the part in the chuck as referenced to the tool. This change in part location directly affects part length and may make the difference between an acceptable or unacceptable part. For example, it has been determined in tests that the spindle may grow in the axial direction by as much as 5-6 mils. This growth would probably occur over an extended period so that the entire error would not be generated in a single part. However, this error has a direct influence on the accuracy and repeatability of the machine.

One system for compensating for spindle growth in numerically controlled lathes is illustrated in the patent of Frank H. Broome, U.S. Pat. No. 3,393,588, issued July 23, 1968, and having a common assignee with the present application. The patented system utilizes a capacitance-type gage for sensing spindle growth and acts through a rather complicated resolver device through phase shifts to move the lead screws by the appropriate amount and direction. The use of a capacitance-type gage has the disadvantage of not always providing a continuously accurate measurement because of the environmental conditions of coolant, dust, or chips during machining operations. The present invention was conceived to overcome this disadvantage and to utilize a different and more direct compensation for spindle growth in a manner to be described below.

SUMMARY OF THE INVENTION

It is the object of the present invention to provide a simple, yet effective and continuously accurate, means for compensating numerically controlled lathe spindle growth.

The above object has been accomplished in the present invention by utilizing a stationary air jet nozzle, and detecting spindle growth by monitoring the gap between the nozzle and a reference surface permanently mounted on the spindle of the lathe. The back pressure from the air nozzle is converted to an electrical signal by a pneumatic-to-electrical transducer and this signal is then amplified, demodulated, and filtered. The resulting D. C. level, proportional to the spindle growth, is then summed with the machine control unit carriage position error signal. This step is accomplished at the summing point of the appropriate axis servo loop operational amplifier. The results of this summing action command the appropriate slide to be offset continually from its programmed position according to the movement of the spindle, therefore compensating for spindle growth. Thus, the present invention imposes a correction signal directly on the numerical control signal, rather than using the correction signal to effect a direct mechanical control on the resolver as was done in the above-mentioned prior patent.

The use of an air gage in the present invention, rather than a capacitance-type gage, to detect spindle growth has the following advantages: (1) the output signal drift was within the desired limit; (2) filters were not required since its low response did not detect axial runout of the reference surface; and (3) coolant, dust, or chips were kept from between the jet and reference surface by the air flow, thereby giving a continuously accurate movement.

BRIEF DESCRIPTION OF THE DRAWINGS

FIG. 1 is a diagram of the air gage arrangement used to detect spindle growth.

FIG. 2 is a diagram illustrating the air gage system used to sense axial displacement of the spindle.

DESCRIPTION OF THE PREFERRED EMBODIMENT

Figure 3:
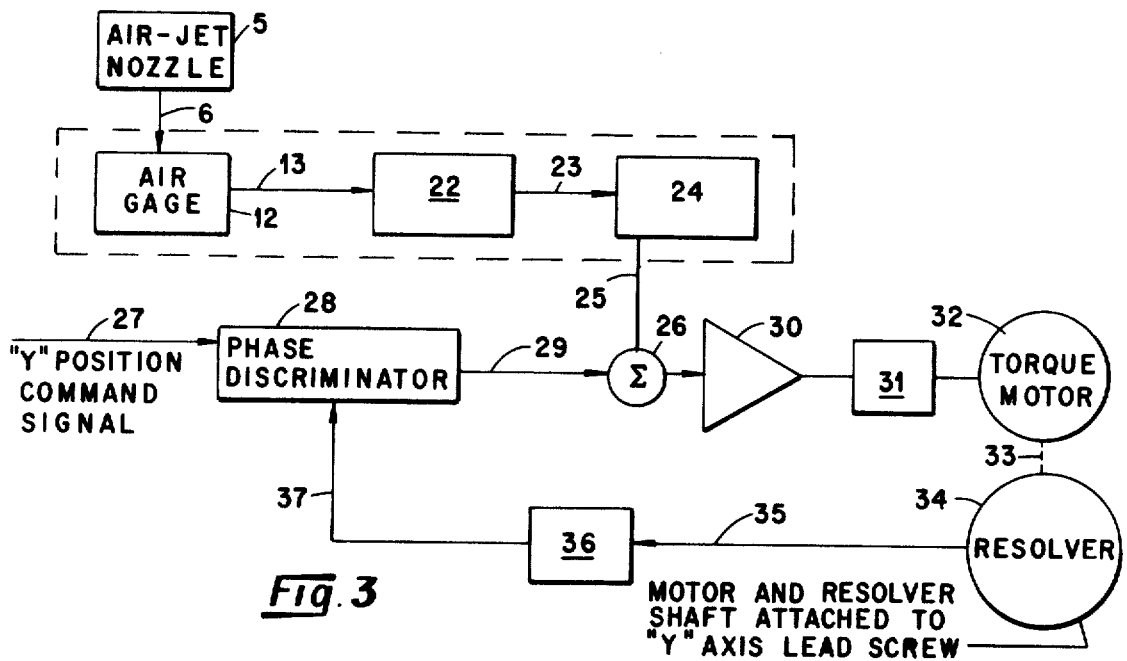
FIG. 3 is a block diagram illustrating schematically the means used to compensate for errors induced by axial expansion of the lathe spindle.

In FIG. 1 of the drawings there is illustrated the air gage arrangement to detect spindle growth in a lathe. A LeBlond 3220 numerically controlled lathe includes a headstock 1, carriage ways 2 a spindle 47, a chuck 8 driven by the spindle, a carriage 45 supporting a tool holder 44 which in turn holds a cutting tool 43 with the carriage being slidable along the carriage ways 2, and a Y-axis lead screw 46 for positioning the carriage 45 along the Y-axis. The lead screw 46 is mechanically coupled to a torque motor 32 for actuation thereby in a manner to be described hereinbelow in connection with FIG. 3. The chuck 8 is adapted to hold a workpiece 42 in a conventional manner. Other details of the LeBlond lathe are not shown since they are not necessary for an understanding of the present invention. An air nozzle 5 is mounted by means of a bracket 4 which in turn is supported by a post 3 fixedly mounted on the carriage ways 2. It should be noted that the carriage ways 2 is affixed to the headstock 1 in a conventional manner. A circular adapter plate, having a side face 7, not shown, facing the air nozzle 5, is permanently attached to the housing, not shown, encompassing the chuck 8 and a portion of the spindle 47. The side face 7 of the adapter plate, facing the nozzle 5, is ground flat to within ±100 microinches to provide a reference surface for the air nozzle 5.

It should be noted that the air nozzle 5 is mounted in such a way that minimizes any movement of the nozzle in relation to the carriage ways 2 of the lathe. The air nozzle 5 is supplied air by by means of an air line 6 which is part of a Sheffield air gage system which is shown schematically in FIG. 2. The air gage is manufactured by the Sheffield Company, Bendix Corporation, Automation and Measurement Division.

In FIG. 2, air is supplied from a source, not shown, through an air supply connector 21, an air line 20, a pressure control valve 18, an air line 17, a variable orifice valve 16, an air line 10, a nozzle connection 9, and the air line 6 to the air nozzle 5. The air line 10 is connected by means of a toggle valve 14 to a nozzle pressure indicator 15. A regulator pressure indicator 19 is connected to the valve 18. The air line 10 is also connected by means of an air line 11 to a Sheffield air-gage linear variable differential transformer (LVDT) 12 such that the back pressure from the air nozzle 5 is converted to an electrical signal. The electrical output of the air gage 12 is connected to a Sheffield Accutron amplifier and demodulator 22 as shown in FIG. 3,148 to be described hereinbelow, by an electrical lead 13. There is a three-mil gap set between the end of the air nozzle 5 and the reference surface 7 in FIG. 1. The pressure regulator 19 of FIG. 2 is set at approximately 17 pounds per square inch. The valve 18 and the valve 16 are then adjusted in such a manner as to provide a zero reading on the nozzle pressure indicator 15 with a 3-mil gap between the end of the air nozzle 5 and the reference surface 7.

The above-mentioned LeBlond 3220 numerically controlled lathe is provided with a General Electric Mark Century control unit, Model 3S7512CC152D1. Such a control unit is described herein as a single-axis control unit in combination with the spindle growth compensation system of the present invention in a manner to be described below. It should be understood that the G. E. control unit is also utilized to control the movements of the cutting tool with respect to a workpiece in a conventional manner, not shown, according to a desired program. This feature is not illustrated since such is not needed for an understanding of the present invention.

Figure 4:
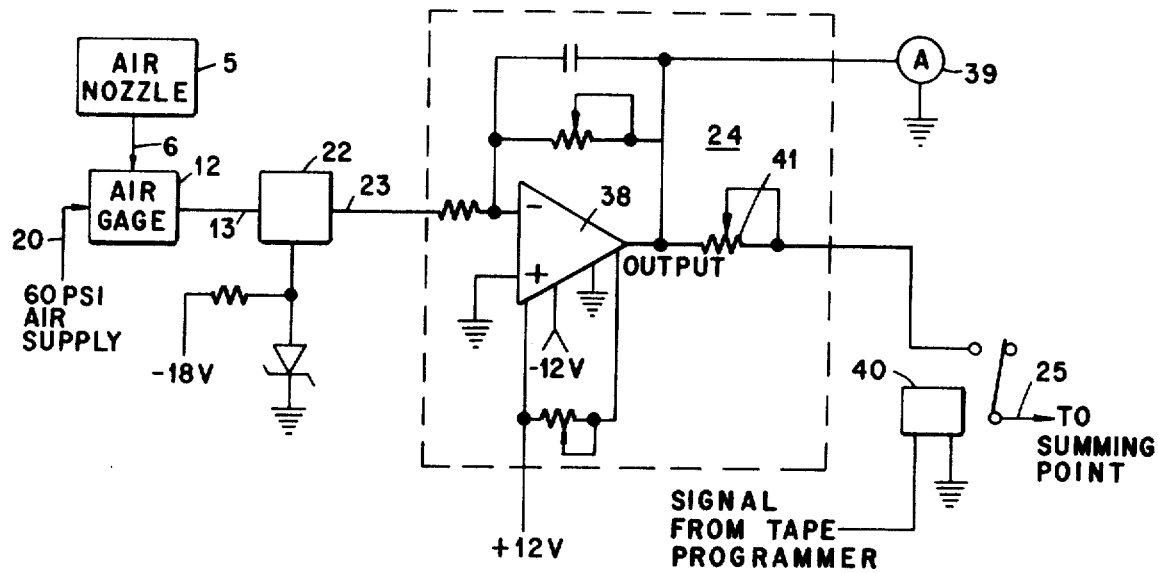
FIG. 4 is a schematic diagram showing in more detail a portion of the system of FIG. 3.

As mentioned above, the electrical output of the air gage 12 is connected by the lead 13 to the Accutron amplifier and demodulator unit 22 as shown in FIGS. 3 and 4. A zener diode is used with the machine control regulated voltage supply to supply −15 volts D. C. to the unit 22. The unit 22 may be a Sheffield Model No. D–50518632, for example. The output of the Accutron 22 is a D. C. voltage level that is proportional to the distance between the air-jet nozzle 5 and the reference surface 7 of the adapter plate of FIG. 1. The output of unit 22 is connected by a lead 23 to a spindle growth compensation current source 24 where it is filtered, inverted, and amplified by an operational amplifier 38 as illustrated more clearly in FIG. 4. The amplifier 38 may be a Philbrick Model PP65AU, for example. The amplifier output is fed into a 1-megohm trimpot 41 that supplies current through the contacts of a relay 40 and by means of a lead 25 to a machine control summing point 26 as shown in FIG. 3.

In FIG. 4, the output of the amplifier 38 is also connected to an ammeter 39 which functions as a spindle growth monitor. The relay 40 of FIG. 4 is mounted in the machine logic control cabinet, not shown. This relay is controlled by the machine mode of operation and punched tape. The relay, in turn, will control the insertion and rejection of the compensation signal from the summing point 26, FIG. 3, of the Y-axis operational amplifier 30. An indicating light, not shown, is provided and is controlled by the relay 40 to indicate the insertion of the compensation signal. The compensation signal cannot be in the circuit during the tool set mode, and can only be inserted by an M function from tape or by manual data read in.

The components 28, 30, 31, 32, 34, and 36 in FIG. 3 are the conventional units employed in the prior art for controlling the positioning of the Y-axis lead screw from signals received from a programmed tape of the G. E. Mark Century control unit. The Y-position command signal is fed by means of an electric lead 27 to a phase discriminator 28. The output of unit 28 is connected by a lead 29 to the summing point 26 of the Y-axis operational amplifier 30. Amplifier 30 output is connected to a Y-axis motor control unit 31 which in turn is connected to a torque motor 32. Motor 32 is coupled by a mechanical coupling 33 to a resolver 34. The motor and resolver shaft is attached to the Y-axis lead screw 46, as illustrated in FIG. 1, in a conventional manner,. In the event that the Y-axis lead screw is not in the proper position as dictated by the input command signal at any given instant, the resolver 34 will provide a feedback signal over lead 35 to a wave shaper filter 36, which in turn provides a 250-cps square wave signal over lead 37 to the phase discriminator 28, such that the position of the carriage 45, FIG. 1, driven by the Y-axis lead screw 46, will be continuously adjusted in accordance with the input command signals over lead 27 to maintain the lead screw carriage 45 and the associated cutting tool 43 mounted thereon in the desired programmed position.

The unit 24 of FIG. 4 is calibrated in the following manner. With a three-mil gap between the air jet nozzle 5 and the reference surface 7, the output of the amplifier 38 is set to zero volts with a centering resistance potentiometer with the use of a vacuum tube millivoltmeter connected to the amplifier output. The linearity of the amplifier 38 output signal is checked every 0.5 mil, starting at a gap of 2.5 mils and continuing to a gap of 8.5 mils. The voltage output of amplifie 38 should be linear to within ±200 millivolts over this range and, if not linear, the necessary adjustments to the trimpots associated with the amplifier are effected to provide the desired linearity. The system should now be in condition for effecting a cutting cycle.

In the operation of the above-described system, when the compensation signal is fed to the summing point 26 during a cutting operation, this signal is then summed with the machine control unit carriage position error signal and the results of this summing action command the Y-axis slide to be offset continually from its programmed position according to the movement of the lathe spindle, therefore continuously compensating for spindle growth.

Two test parts were cut to show the effects of spindle growth with and without the spindle growth compensator of the present invention. Both parts were cut across the face in a series of ½-inch bands using the cross slide of the lathe only. After each band was cut, the tool was left in place and the spindle rotated for ten minutes, allowing it to heat up and grow. Another band was then cut, etc. The spindle speed was 500 rpm between bands 1 and 2, and 2 and 3, and 1,300 rpm between bands 3 and 4, and 4 and 5. Small depths of cut and a Micarta vacuum chuck between the part and the adapter plate kept temperatures generated in the part minimal. Spindle growth was recorded during this test by monitoring the output of the air gage. Measurements from a reference point at the outer edge of band 1 revealed the errors in the finished part.

Figure 5:
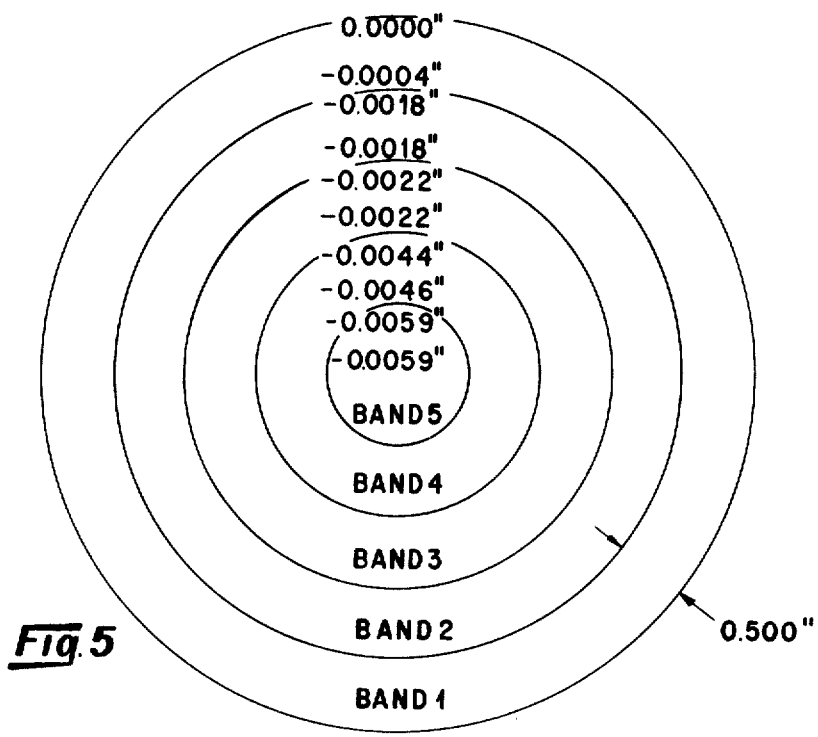
FIG. 5 shows a machined face of an uncompensated part.
Figure 6:
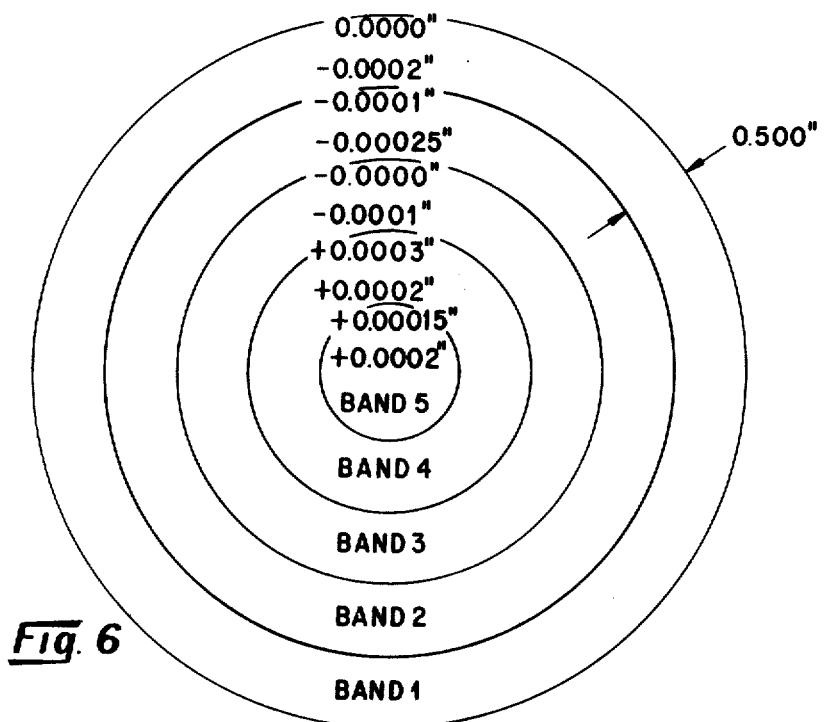
FIG. 6 shows a machined face of a compensated part, and when compared with FIG. 5 illustrates the improvement that can be obtained by use of the present invention.

FIG. 5 shows the results on a test part without spindle growth compensation, and FIG. 6 shows the results on a test part with spindle growth compensation. The spindle was at ambient temperature before each part was cut. By observing the inspection results of the uncompensated part, FIG. 5, and the compensated part, FIG. 6, it is easily noted that the maximum error was reduced from −5.9 to +0.3 mil by using the spindle growth compensation system. Subsequent tests indicated that spindle growth could be compensated for within ±100 microinches when the main slide was continually in motion.

While the spindle growth compensating system of the present invention has been described as being used with an arrangement wherein the carriage 45 supporting a cutting tool 43 is moved by the Y-axis lead screw of the lathe, it will appear clear that the present invention may be used with other machining mechanisms having spindles or other components affected by increasing or decreasing temperatures during the operation thereof. Accordingly, the term "spindle" as used herein is not intended to be restrictive to lathe spindles, but is intended to incorporate other machine components, such as, for example, mandrels, turntables, etc. It will be seen that the spindle growth compensating system of the present invention provides a number of unique advantages for providing high-precision machining. For example, it permits machining operations to be conducted immediately after startup, since it is not necessary to wait for the temperatures of the machine to stabilize at some operating temperature which may or may not remain substantially constant. Also, compensation is provided for any changes in spindle length or position resulting from variations in temperatures in the machine components irrespective of whether such changes result from increasing or decreasing temperatures and/or mechanical deformations. Machining operations need not be hurried to avoid errors resulting from temperature variations since such variations are automatically and accurately compensated for. Further, the increase in precision provided by the present invention is substantial as evidenced by the above tests as illustrated by a comparison of FIGS. 5 and 6.

The invention described hereinabove is utilized with a LeBlond Model 3220 numerically controlled lathe as already mentioned. It should be understood that the present invention may also be utilized with a different type of lathe. For example, one such lathe is Excello Model No. 922. In the Excello lathe the cutting tool is movable only along the X-axis, while the spindle housing is mounted on the carriage which is movable along the Y-axis by the Y-axis lead screw. When the present invention is used with the Excello lathe, the reference adapter plate and the air nozzle spaced a desired distance therefrom are both mounted on the spindle housing and carriage for detecting any spindle growth, such that the Y-axis lead screw is controlled in the same manner as described above for the LeBlond lathe. Thus, the carriage which carries the LeBlond cutting tool in one system, or the Excello spindle housing in the other system, is caused to move by the Y-axis lead screw to continuously compensate for any spindle growth.

While the spindle growth compensating system of this invention incorporates a technique for inserting a compensation signal into a machine control loop, it will appear clear that the present invention of this technique may be used with still other control systems for the correction of machine errors.

As various changes may be made in the form, construction, and arrangement of the parts herein without departing from the sprit and scope of the invention and without sacrificing any of its advantages, it is to be understood that all matter herein is to be interpreted as illustrative and not in a limiting sense.

We claim:

1. A spindle growth compensating system for use with a numerically controlled lathe, said lathe including a headstock, a spindle extending from and supported by said headstock, a chuck coupled to said spindle and for holding a workpiece, a housing encompassing said chuck and affixed thereto, a carriage ways, a carriage slidable on said carriage ways, said carriage supporting a cutting tool, a Y-axis lead screw, a torque motor, said Y-axis lead screw being mechanically coupled to said motor and threadably coupled to said tool supporting carriage, said carriage adapted to be moved along the Y-axis of said lathe by said lead screw, said system including numerical control signal means for controlling said torque motor which in turn drives said lead screw to effect the positioning of said tool supporting carriage along said Y-axis in accordance with a Y-axis position error signal, a circular adapter plate permanently mounted on and encompassing said chuck housing and a portion of said spindle, an air nozzle fixedly mounted on said carriage ways by means of a support post, said adapter plate provided with a side face which faces the exit end of said air nozzle to provide a reference surface for said air nozzle, said air nozzle positioned a fixed selected distance from said adapter plate side at startup operation of said lathe, a source of air, means for supplying air from said air source at a selected flow rate to said air nozzle, means coupled to the air input to said air nozzle for sensing the backpressure from said nozzle and producing an electrical signal with an amplitude proportional to any relative movement in a Y-axial direction between said plate side and said air nozzle due to spindle growth during lathe operation, means for scaling said signal, and means for summing said scaled signal with the Y-axis numerical control position error signal, the output of said summing means connected to said motor, thereby automatically effecting the repositioning of said tool supporting carriage along the Y-axis of said lathe by means of said Y-axis lead screw on a continuous basis to compensate for said spindle growth during operation of said lathe.

2. The system set forth in claim 1, wherein said means for sensing said backpressure from said air nozzle and producing an electrical signal is a pneumatic-to-electrical transducer.

3. The system set forth in claim 2, wherein said means for supplying air to said air nozzle at a selected flow rate includes a pressure control valve, and a variable orifice valve connected between said nozzle and said air source, a nozzle pressure indicator coupled to the air input to said nozzle, and a pressure regulator indicator coupled across said pressure control valve.

4. The system set forth in claim 2, wherein said scaling means includes an amplifier and demodulator unit coupled to the output of said transducer, an operational amplifier coupled to the output of said amplifier and demodulator unit, and potentiometer means associated with said operational amplifier for adjusting the output therefrom to zero with said fixed selected distance between said nozzle and adapter plate at said startup, the output of said operational amplifier being coupled to said summing means.

5. The system set forth in claim 4, wherein there is further included a relay, said relay, when energized, effecting the coupling of said operational amplifier output to said summing means, the operation of said relay being controlled by said numerical control signal means.

* * * * *